April 26, 1932. W. ARMSTRONG 1,856,016
PLANTING AND TRANSPLANTING DEVICE
Filed May 9, 1930 2 Sheets-Sheet 1
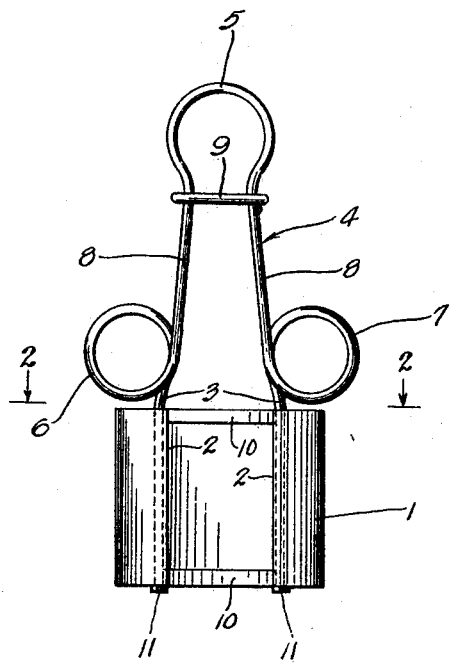
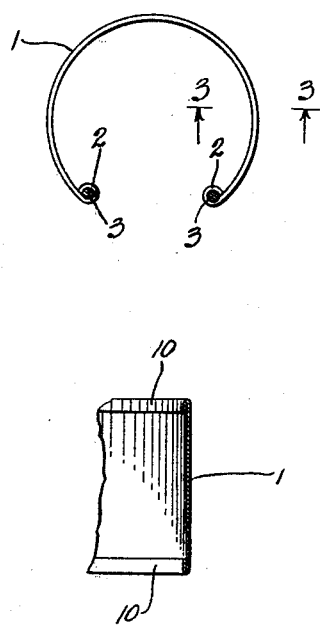
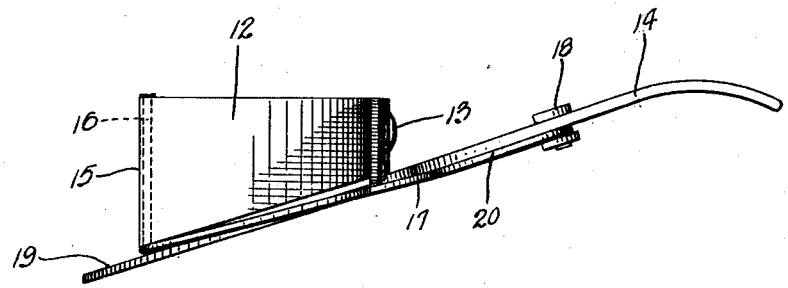
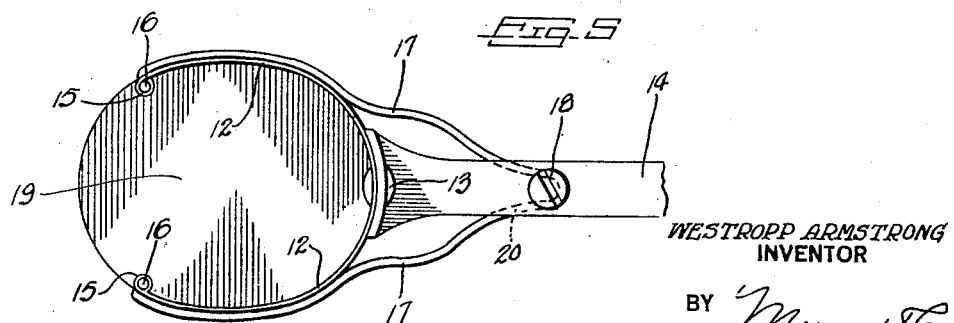
WESTROPP ARMSTRONG
INVENTOR
BY Munn & Co.
ATTORNEYS April 26, 1932.   W. ARMSTRONG   1,856,016
PLANTING AND TRANSPLANTING DEVICE
Filed May 9, 1930   2 Sheets-Sheet 2
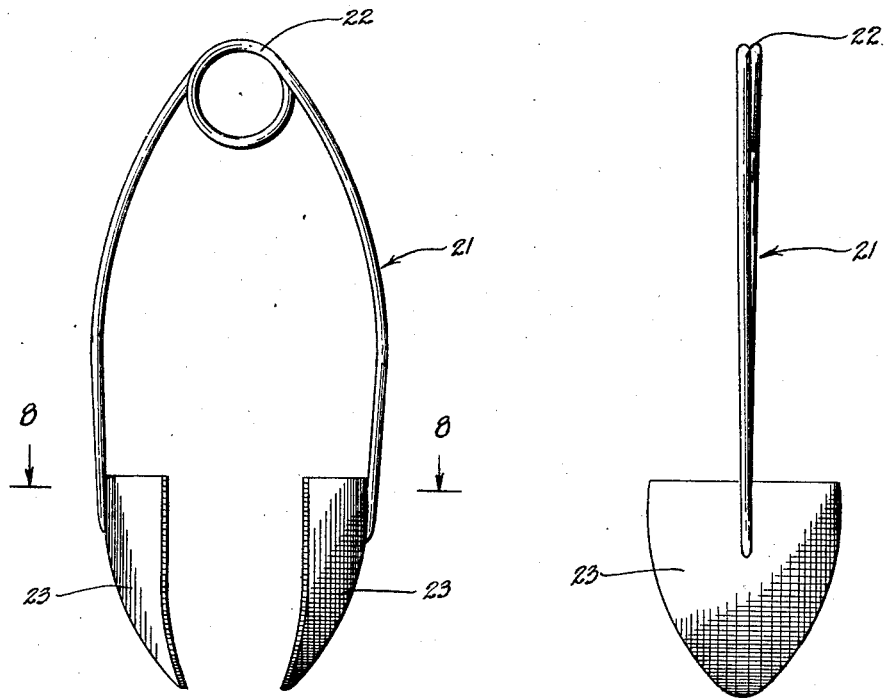
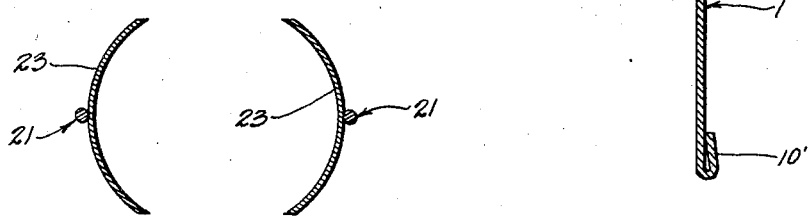
WESTROPP ARMSTRONG
INVENTOR
BY *Munn & Co.*
ATTORNEYS Patented Apr. 26, 1932

1,856,016

UNITED STATES PATENT OFFICE

WESTROPP ARMSTRONG, OF GLEN ELLYN, ILLINOIS

PLANTING AND TRANSPLANTING DEVICE

Application filed May 9, 1930. Serial No. 451,088.

My invention relates to improvements in planting and transplanting devices, and it consists in the combinations, constructions, and arrangements herein described and claimed.

An object of my invention is to provide a planting and transplanting device in which means is provided whereby plants may be removed as when transplanting in such a manner that the soil in which the roots of the plant are embedded is not disturbed.

A further object is to provide a device of the type described whereby plants when they are transplanted may be transplanted in connection with a desirable quantity of the original soil in which the roots are embedded.

A further object is to provide a device of the type described in which means is provided whereby an efficient operation may be attained, irrespective of the local soil conditions.

A further object is to provide a device in which, when a plant is being moved, the device is automatically locked in its operative position, thereby insuring accuracy in operation as well as ease in manipulation.

A further object is to provide a device in which the number of moving parts has been reduced to a minimum and in which certain parts are formed so that the roots of the plants remain unbroken or uncut.

A further object is to provide a device of the type adapted to be manipulated by one hand.

Other objects and advantages will appear in the following specification, and the novel features of the invention will be particularly pointed out in the appended claims.

My invention is illustrated in the accompanying drawings forming part of this application, in which Figure 1 is a side elevation of my invention, Figure 2 is a sectional view taken along the line 2—2 of Figure 1, Figure 3 is a detail view of a portion of my device, Figure 4 is a side elevation of a slightly different form of my device, Figure 5 is a top plan view of the same device, Figure 6 is a side elevation of another form of my device, Figure 7 is a side elevation of the device turned 90°, Figure 8 is a sectional view taken along the line 8—8 of Figure 6, and Figure 9 is a detail view of an edge construction which may be employed in connection with the structure shown in Figure 1.

In carrying out my invention, I make use of a substantially cylindrical or flexible band member 1 having its edges formed to provide loops or end formations 2, see Figure 2, for receiving extending or end portions 3 of a resilient actuating member 4. The latter is preferably formed from a single piece of wire and is bent at 5 and again at 6 and 7 for providing loop formations. The gripping member is provided with portions 8 which are inclined downwardly and away from each other.

In Figure 1, I have shown a link 9 as being disposed upon the actuating member. The device is shown in its normal position in this figure. The tension of the wire from which the actuating member is formed is such that the sides tend to move away from each other. The end portions 3 are loosely disposed within the loops 2. The band member 1 is preferably formed from a suitable flexible material such as sheet metal and has its edges turned over as at 10. The ends of the members 3 may be flattened as at 11, see Figure 1, for holding the band member 1 upon the end portions.

In operation, the loops 6 and 7 provide convenient gripping elements. The band member 1 is arranged to be pushed into the soil surrounding a plant. It will be noted in referring to Figure 1 that the diameter of the band member 1 is the same throughout its entire length. After the device has been positioned in the soil preparatory to removing a plant, the side portions 8 are moved toward each other, at which time the diameter of the band member 1 is reduced. Such change in the diameter of the member will of course tend to firmly retain the soil within the band member when the device is lifted.

In referring again to Figure 1, it will be noted that the end portions 3 are formed in such a manner that when the diameter of the band member 1 is reduced, the member assumes a tapered condition. In other words, the outer end of the member assumes a smaller diameter than the opposite end. This feature additionally tends to firmly retain the soil within the band member. The link 9 tends to move downwardly whenever the side portions 8 are moved toward each other. Any movement of the link 9 will of course hold the side portions 8 in their shifted position.

The side portions are limited in their tendency to move back to their normal positions by reason of the link 9. When the plant has been shifted, the plant and the soil surrounding the roots may be released by pressing the side portions 8 slightly together and lifting the link 9. This permits the band member 1 to assume its normal position, at which time the device is easily removed from the contents within the member 1.

In Figure 9 I have shown a slightly modified edge 10' which may be employed in connection with the band member 1 and particularly its lower end. The edge is slightly more rounded than the fold shown in Figure 3 and is designed with a view to eliminating the tendency of the cutting of any of the roots of the plants. An important feature in connection with my invention is the fact that plants may be conveniently transplanted, let us say, after a mulch paper has been laid upon the ground. The holes may be previously cut in the paper and by reason of my device the plants may be planted in the soil through the openings in the paper. In addition to this, the cylindrical member 1 is arranged to be manipulated in such a manner that loose or hard soil may be cut and lifted with the device during the shifting process. The roots of the plants are not impaired and the original soil in which the roots are embedded is shifted with the plant. The cylindrical member 1 automatically moves free from the soil as soon as the link 9 is lifted. The operator may pass two fingers through the loops 6 and 7 and with the third finger lift the link 9, whereby the device assumes its normal condition, as shown in Figure 1.

In Figures 4 and 5 I have shown a slightly different form of my device in which a flexible member 12 is secured at 13 to a handle 14. The edges of the member 12 are looped as at 15 for receiving end portions 16 of a spring wire 17. The latter is secured to the handle 14 as by means of a screw or bolt 18. A combination bottom and cutting plate 19 is associated with the handle 14. The plate may be provided with an extension 20 through which the screw 18 passes, whereby the bottom may be supported in rigid assembly with the handle. The spring wire 17 normally holds the sides of the member 12 as shown in Figure 5. The sides may be moved toward each other by pressing the sides of the spring wire 17 together. The ends 16 are of course arranged loosely within the loops 15. The operation of the member 12 is substantially identical with the operation in connection with the structure shown in Figure 1. An added feature is the bottom plate 19.

In Figures 6, 7, and 8, I show a further modification in that I provide a spring wire handle 21 bent at 22 to form a loop and provided with spade elements 23 upon its ends. The spade elements are slightly curved, as will be seen from viewing Figure 8. Figure 1 shows the normal positions of the spade elements with respect to each other. The spade elements may be inserted into the soil surrounding a plant and moved in the direction of each other through the medium of the handle comprising the spring wire 21 for firmly retaining the soil between the spade elements.

I claim:

1. A planting and transplanting device comprising a substantially cylindrical member insertible in soil, said cylindrical member being open on one of its sides for providing edges, said edges being formed to provide loops, and a resilient actuating member having end portions disposed within said loops, whereby the cylindrical member may be moved for increasing or decreasing its diameter.

2. A planting and transplanting device comprising an arcuate-shaped flexible member having a handle, a bottom plate associated with said arcuate-shaped flexible member and connected with said handle, and spring means secured to said handle and operatively connected with said flexible member.

3. A planting and transplanting device comprising a flexible band member, and a resilient actuating member formed for providing extending portions, said band member being provided with end formations for receiving the extending portions of the actuating member whereby the band member may be moved for varying the content thereof when the resilient member is actuated.

4. A planting and transplanting device comprising a flexible band member, and a resilient actuating member formed for providing extending portions, said band member being provided with end formations for receiving the extending portions of the actuating member whereby the band member may be moved for varying the content thereof when the resilient member is actuated, said resilient actuating member being provided with formations whereby the same may be gripped for being actuated.

5. A planting and transplanting device comprising a handle member, a flexible band member connected with said handle member, and a resilient actuating member connected with the handle member and formed for providing extending portions, said band member being provided with end formations for receiving the extending portions of the actuating member whereby the band member may be moved for varying the content thereof when the resilient member is actuated.

6. A planting and transplanting device comprising a handle member, a flexible band member connected with said handle member, and a resilient actuating member connected with the handle member and formed for providing extending portions, said band member being provided with end formations for receiving the extending portions of the actuating member whereby the band member may be moved for varying the content thereof when the resilient member is actuated, said resilient actuating member being provided with formations whereby the same may be gripped for being actuated.

7. A planting and transplanting device comprising a handle member provided with an extending plate portion, a flexible band member connected with the handle portion and positioned adjacent a side of the plate portion, and a resilient actuating member connected with the handle member and formed for providing extending portions, said band member being provided with end formations for receiving the extending portions of the actuating member whereby the band member may be moved for varying the content thereof when the resilient member is actuated.

8. A planting and transplanting device comprising a handle member provided with an extending plate portion, a flexible band member connected with the handle portion and positioned adjacent a side of the plate portion, and a resilient actuating member connected with the handle member and formed for providing extending portions, said band member being provided with end formations for receiving the extending portions of the actuating member whereby the band member may be moved for varying the content thereof when the resilient member is actuated, said resilient actuating member being provided with formations whereby the same may be gripped for being actuated.

Signed at Chicago, in the county of Cook and State of Illinois, this 8th day of May, A. D. 1930.

WESTROPP ARMSTRONG.